United States Patent
Fu et al.

(10) Patent No.: US 10,534,209 B1
(45) Date of Patent: Jan. 14, 2020

(54) LIQUID CRYSTAL STRUCTURE FOR CONTROLLING BRIGHTNESS UNIFORMITY IN A WAVEGUIDE DISPLAY

(71) Applicant: Facebook Technologies, LLC, Menlo Park, CA (US)

(72) Inventors: Yijing Fu, Redmond, WA (US); Lu Lu, Seattle, WA (US); Pasi Saarikko, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 108 days.

(21) Appl. No.: 15/682,294

(22) Filed: Aug. 21, 2017

(51) Int. Cl.
*G02F 1/133* (2006.01)
*G02F 1/13* (2006.01)

(52) U.S. Cl.
CPC ........ *G02F 1/13306* (2013.01); *G02F 1/1326* (2013.01)

(58) Field of Classification Search
CPC . G02F 1/13306; G02F 1/1326; G02B 27/017; G02B 27/0172; G02B 27/0176; G02B 27/0093; G02B 2027/0132–0136; G02B 2027/0174; G02B 2027/0178; G06F 3/012; G06F 3/013; H04N 5/7491
See application file for complete search history.

(56) References Cited

U.S. PATENT DOCUMENTS

| | | | | |
|---|---|---|---|---|
| 5,452,385 A | * | 9/1995 | Izumi | ........................ G02B 6/34 347/241 |
| 5,966,112 A | * | 10/1999 | Katagiri | ............ G02F 1/133362 178/18.01 |
| 6,429,913 B2 | * | 8/2002 | Putilin | ..................... G02B 5/32 349/62 |
| 8,233,204 B1 | * | 7/2012 | Robbins | ............... G02B 5/1828 345/7 |
| 8,508,830 B1 | | 8/2013 | Wang | |
| 9,762,851 B1 | | 9/2017 | Baumert et al. | |
| 2002/0101643 A1 | | 8/2002 | Kobayashi | |
| 2004/0160535 A1 | * | 8/2004 | Chuman | .............. H04N 13/395 348/739 |

(Continued)

OTHER PUBLICATIONS

"4K e-shift 3 Technology I DLA-X900R/DLA-X700R/DLA-XS00R I JVC," JVC Kenwood Corporation, undated, 5 pages, [Online] [Retrieved on Mar. 19, 2018] Retrieved from the Internet <URL:http://eu.jvc.com/microsite/eu/dla-x900r/feature01.html>.

*Primary Examiner* — Nitin Patel
*Assistant Examiner* — Amy Onyekaba
(74) *Attorney, Agent, or Firm* — Fenwick & West LLP (57) ABSTRACT

A near-eye display (NED) includes a source assembly that emits image light, a waveguide-based display assembly, and a controller coupled to the waveguide-based display assembly, and an optical assembly. The waveguide-based display assembly includes a liquid crystal (LC) waveguide, an input area, and an output area. The LC waveguide comprising a first glass layer, a second glass layer, and a LC layer between the first and second glass layers. The LC waveguide propagates the image light in-coupled via the input area in accordance with emission instructions toward the output area that out-couples the image light to a user's eye. The controller generates the emission instructions and provides the emission instructions to the LC waveguide for generating the image light of substantially uniform brightness.

19 Claims, 6 Drawing Sheets

(56) References Cited

U.S. PATENT DOCUMENTS

| | | |
|---|---|---|
| 2010/0245321 A1* | 9/2010 | Ogita .................... G02F 1/1334 |
| | | 345/211 |
| 2010/0246003 A1 | 9/2010 | Simmonds et al. |
| 2010/0271537 A1 | 10/2010 | Endoh et al. |
| 2012/0235886 A1 | 9/2012 | Border et al. |
| 2013/0021226 A1 | 1/2013 | Bell |
| 2013/0314793 A1 | 11/2013 | Robbins et al. |
| 2014/0168260 A1* | 6/2014 | O'Brien ................ G09G 5/377 |
| | | 345/633 |
| 2015/0015818 A1* | 1/2015 | Kim .................... G02F 1/13306 |
| | | 349/36 |
| 2015/0260995 A1* | 9/2015 | Mukawa ............ G02B 27/0172 |
| | | 345/8 |
| 2016/0041384 A1* | 2/2016 | Robbins ............. G02B 27/0093 |
| | | 345/156 |
| 2016/0044276 A1 | 2/2016 | Shearman et al. |
| 2016/0048017 A1 | 2/2016 | Kasahara et al. |
| 2016/0055822 A1* | 2/2016 | Bell .................. G02B 27/0172 |
| | | 345/207 |
| 2016/0241217 A1* | 8/2016 | Sazegar .............. G02F 1/13306 |
| 2016/0262608 A1 | 9/2016 | Krueger |
| 2016/0270656 A1 | 9/2016 | Samec et al. |
| 2016/0282635 A1 | 9/2016 | Yang et al. |
| 2016/0286204 A1 | 9/2016 | Grata et al. |
| 2016/0295202 A1 | 10/2016 | Evans et al. |
| 2016/0306171 A1 | 10/2016 | Rudolph et al. |
| 2016/0379606 A1* | 12/2016 | Kollin ................ G02B 27/0093 |
| | | 345/428 |
| 2017/0045746 A1 | 2/2017 | Ellsworth et al. |
| 2017/0068311 A1 | 3/2017 | Evans et al. |
| 2017/0097506 A1 | 4/2017 | Schowengerdt et al. |
| 2017/0131545 A1* | 5/2017 | Wall .................. G02B 27/0101 |
| 2018/0210195 A1 | 7/2018 | Chee et al. |
| 2018/0348522 A1* | 12/2018 | Young ................ G02B 27/0172 |
| 2019/0041634 A1* | 2/2019 | Popovich ................ G01S 17/66 |

\* cited by examiner

LIQUID CRYSTAL STRUCTURE FOR CONTROLLING BRIGHTNESS UNIFORMITY IN A WAVEGUIDE DISPLAY

BACKGROUND

The present disclosure generally relates to near-eye display (NED) systems, and specifically relates to a liquid crystal structure for controlling brightness uniformity in a waveguide display.

A NED that includes a waveguide-based display uses a two-dimensional pupil expander to achieve pupil matching between a human vision system and a waveguide-based display system of the NED. However, in a two-dimensional pupil expansion system, light propagates through a waveguide in multiple paths with an approximately same optical path length. Because of that, some light intensity signals are canceled on the waveguide, whereas some other light intensity signals are superimposed on the waveguide. Due to this multipath interference effect, the brightness of image light emitted from a waveguide-based display is non-uniform, which negatively affects visual experience.

SUMMARY

An eyeglass-type platform representing a near-eye display (NED) is presented herein. The NED may be part of a virtual reality (VR) system, an augmented reality (AR) system, a mixed reality (MR) system, or some combination thereof. The NED includes a source assembly configured to emit image light, a waveguide-based display assembly coupled to the source assembly, and a controller coupled to the waveguide-based display assembly. The waveguide-based display assembly includes a liquid crystal (LC) waveguide comprising an input area configured to in-couple the image light into the LC waveguide, and an output area configured to out-couple the image light from the LC waveguide toward an eye-box of the NED. The LC waveguide further includes a first glass layer, a second glass layer, and a LC layer between the first glass layer and the second glass layer. The LC layer is configured to adjust phases of the image light in accordance with emission instructions such that the image light output from the output area is substantially uniform across the output area. The adjustment of phases of the image light causes averaging out of interference patterns of the image light output from the output area, which leads to substantially uniform brightness of the image light directed to a user's eye and improved visual experience. The controller generates the emission instructions and provides the emission instructions to the LC waveguide.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A liquid crystal (LC) waveguide display integrated into a near-eye display (NED) is presented herein. The NED may be part of, e.g., a virtual reality (VR) system, an augmented reality (AR) system, a mixed reality (MR) system, or some combination thereof. The NED may also be referred to as a head-mounted display (HMD). The LC waveguide display includes a LC layer integrated between two glass layers, which forms a LC waveguide. Light is in-coupled into the LC waveguide via an input area (e.g., an in-coupling grating). As the light propagates through the LC waveguide, the LC layer is rapidly modulated, e.g., turned on and off. The modulation of the LC layer causes averages out intensity differences of light caused by multipath interference prior to emission from an output area (e.g., an out-coupling grating) of the LC waveguide. In some embodiments, multiple LC waveguides may be stacked in a display system of the NED to create a multi-color LC waveguide display.

Figure 1:
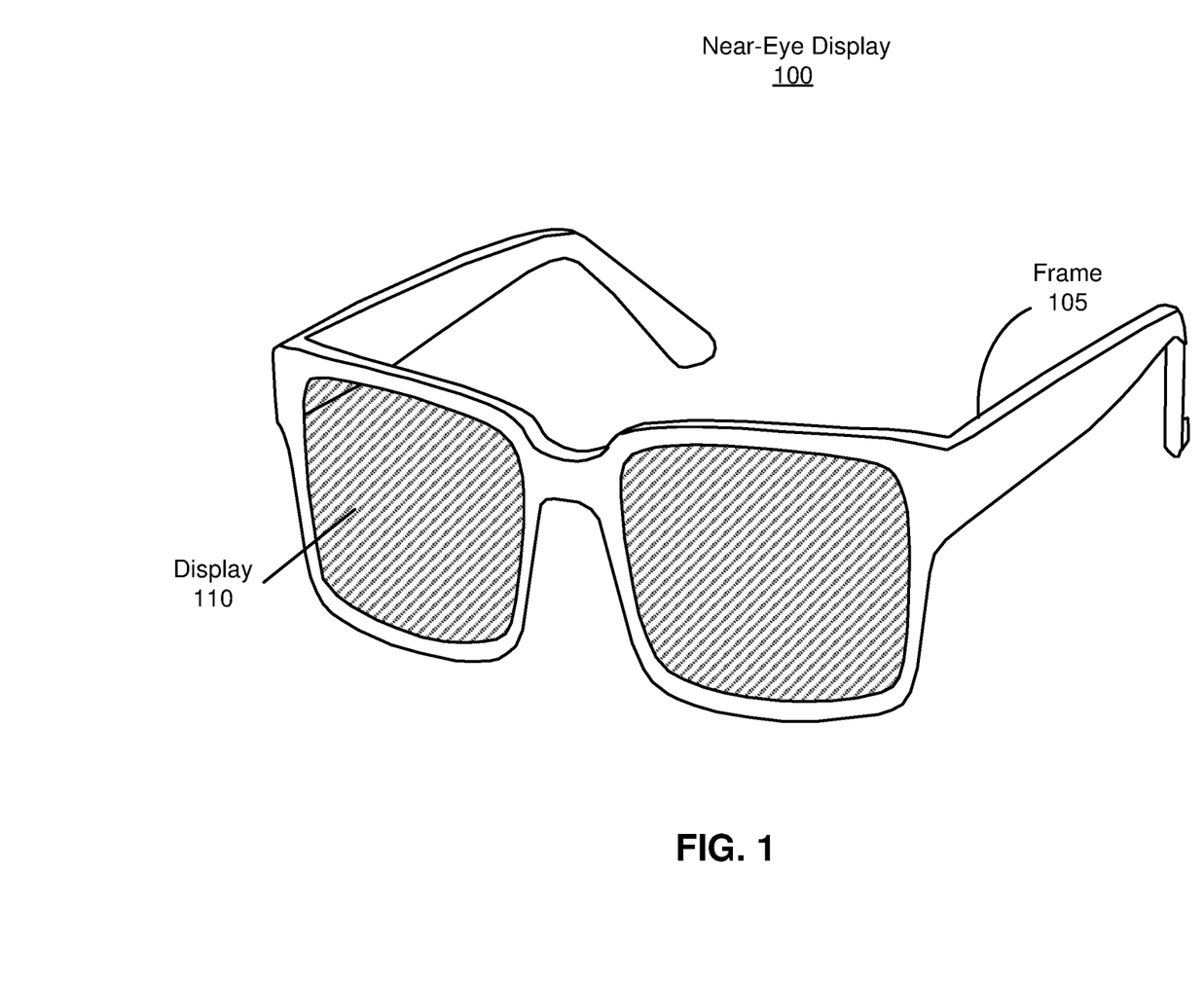
FIG. 1 is a diagram of a near-eye display (NED), in accordance with an embodiment.

FIG. 1 is a diagram of a NED 100, in accordance with an embodiment. The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 is generally configured to operate as a VR NED. However, in some embodiments, the NED 100 may be modified to also operate as an AR NED, a MR NED, or some combination thereof. For example, in some embodiments, the NED 100 may augment views of a physical, real-world environment with computer-generated elements (e.g., images, video, sound, etc.).

The NED 100 shown in FIG. 1 includes a frame 105 and a display 110. The frame 105 includes one or more optical elements which together display media to users. The display 110 is configured for users to see the content presented by the NED 100. As discussed below in conjunction with FIGS. 2-3, the display 110 includes a waveguide-based display assembly that generates an image light to present media to an eye of the user. The NED 100 shown in FIG. 1 is only an example of a VR system, an AR system, a MR system, or some combination thereof. However, in alternate embodiments, the NED 100 may also be referred to as a HMD.

Figure 2:
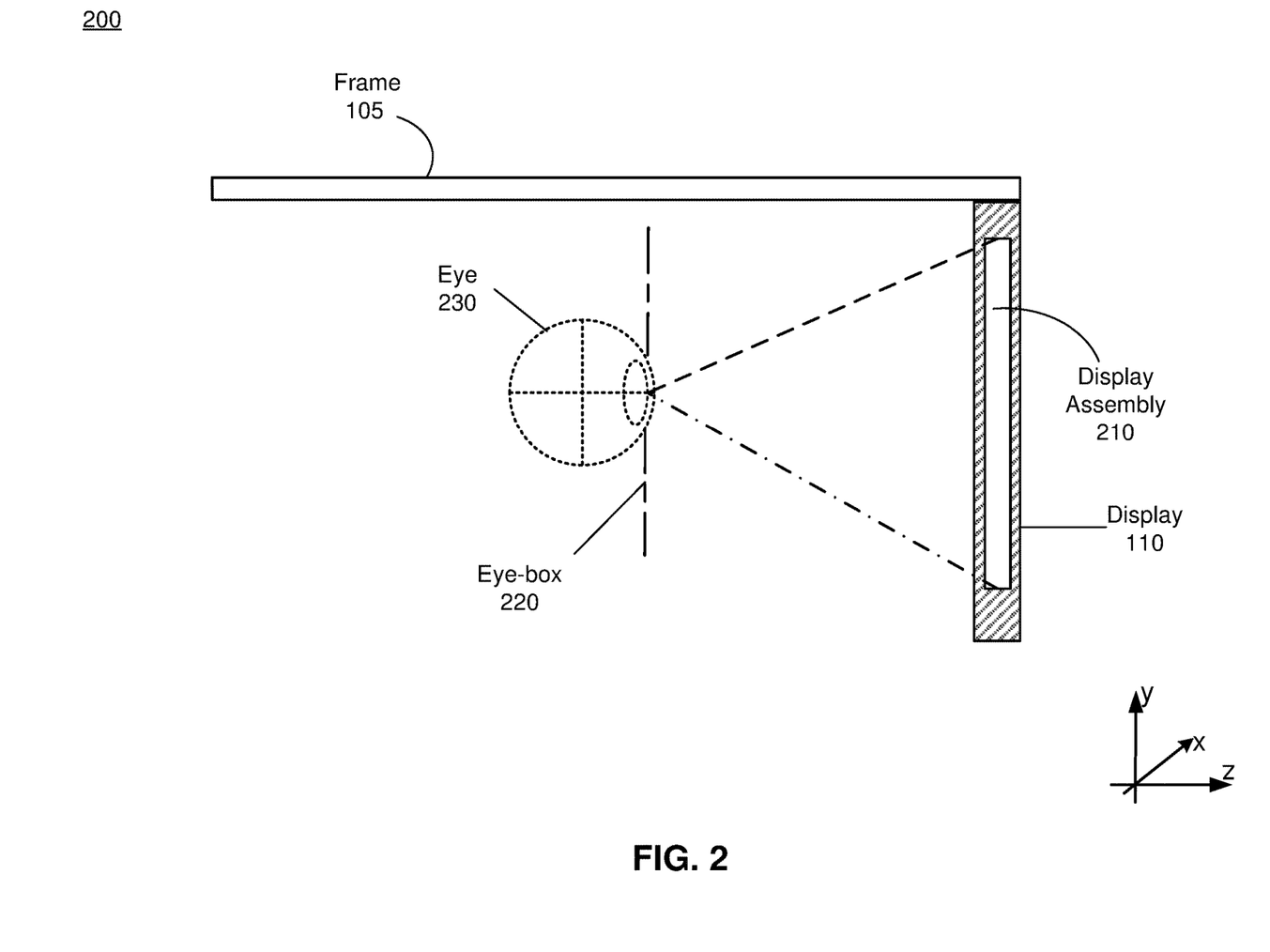
FIG. 2 is a cross-section of an eyewear of the NED in FIG. 1, in accordance with an embodiment.

FIG. 2 is a cross section 200 of an eyewear of the NED 100 illustrated in FIG. 1, in accordance with an embodiment. The cross section 200 includes at least one display assembly 210 integrated into the display 110, and an eye-box 220. The eye-box 220 is a location where an eye 230 is positioned when a user wears the NED 100. In some embodiments, the frame 105 may represent a frame of eye-wear glasses. For purposes of illustration, FIG. 2 shows the cross section 200 associated with a single eye 230 and a single display assembly 210, but in alternative embodiments not shown, another display assembly which is separate from the display assembly 210 shown in FIG. 2, provides image light to another eye 230 of the user.

The display assembly 210 is configured to direct the image light to the eye 230 through the eye-box 220. In some embodiments, when the NED 100 is configured as an AR NED, the display assembly 210 also directs light from a local area surrounding the NED 100 to the eye 230 through the eye-box 220. The display assembly 210 may be configured to emit image light at a particular focal distance in accordance with varifocal instructions, e.g., provided from a varifocal module (not shown in FIG. 2).

The display assembly 210 may be composed of one or more materials (e.g., plastic, glass, etc.) with one or more refractive indices that effectively minimize the weight and widen a field of view of the NED 100. In alternate configurations, the NED 100 includes one or more optical elements between the display assembly 210 and the eye 230. The optical elements may act to, e.g., correct aberrations in image light emitted from the display assembly 210, magnify image light, perform some other optical adjustment of image light emitted from the display assembly 210, or some combination thereof. The example for optical elements may include an aperture, a Fresnel lens, a convex lens, a concave lens, a liquid crystal lens, a diffractive element, a waveguide, a filter, a polarizer, a diffuser, a fiber taper, one or more reflective surfaces, a polarizing reflective surface, a birefringent element, or any other suitable optical element that affects image light emitted from the display assembly 210. A specific structure of the display assembly 210 is discussed in more detail in conjunction with FIG. 3A.

In some embodiments, the NED 100 further includes an eye tracker (not shown in FIG. 2) for determining and tracking a position of the eye 230, i.e., an angle and orientation of eye-gaze. Note that information about the position of the eye 230 also includes information about an orientation of the eye 230, i.e., information about user's eye-gaze. Based on the determined and tracked position and orientation of the eye 230, the NED 100 adjusts image light emitted from the display assembly 210. In some embodiments, the NED 100 adjusts focus of the image light and ensures that the image light is in focus at the determined angle of eye-gaze in order to mitigate the vergence-accommodation conflict. Additionally or alternatively, the NED 100 adjusts resolution of the image light by performing foveated rendering of the image light, based on the position of the eye 230. Additionally or alternatively, the NED 100 uses the information on a gaze position and orientation to provide contextual awareness for the user's attention, whether on real or virtual content. The eye tracker generally includes an illumination source and an imaging device (camera). In some embodiments, components of the eye tracker are integrated into the display assembly 210. In alternate embodiments, components of the eye tracker are integrated into the frame 105.

Figure 3A:
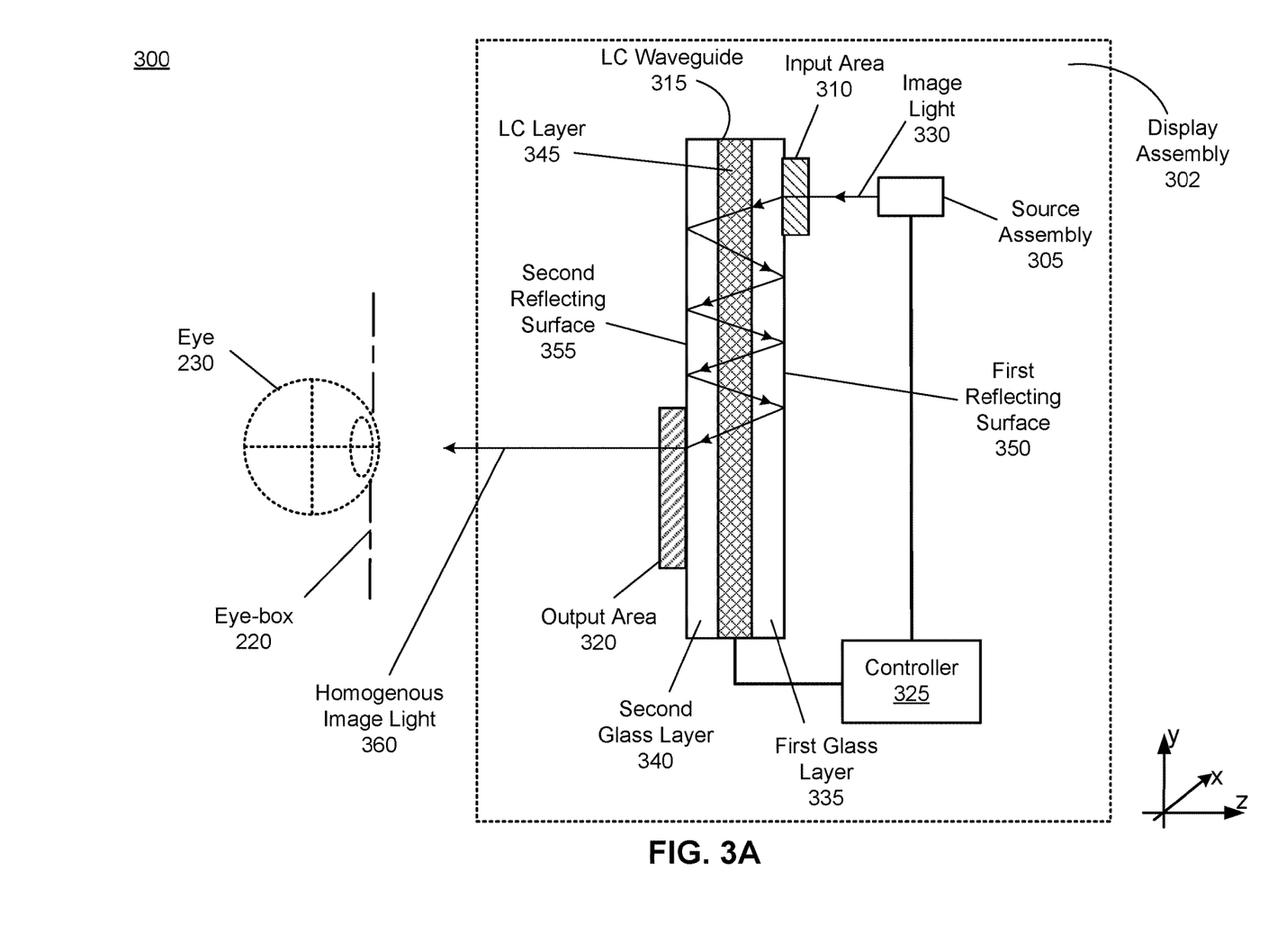
FIG. 3A is a cross-section of a waveguide-based display, which may be part of the NED in FIG. 1, in accordance with an embodiment.

FIG. 3A is a cross-section 300 of a display assembly 302, in accordance with an embodiment. The display assembly 302 may be an embodiment of the display assembly 210 in FIG. 2. An embodiment of the display assembly 302 shown in FIG. 3A comprises a source assembly 305, an input area 310, a LC waveguide 315, an output area 320, and a controller 325. In other embodiments, the display assembly 302 comprises additional or fewer elements than those described herein.

The source assembly 305 is configured to emit image light 330. In one embodiment, the source assembly 305 includes an electronic display (not shown in FIG. 3A) configured to emit the image light 330. In another embodiment, the source assembly 305 includes a one-dimensional array of micro light-emitting diodes (μLEDs) with a microelectromechanical system (MEM) mirror. In yet another embodiment, the source assembly 305 includes a two-dimensional array of μLEDs. In yet another embodiment, the source assembly 305 includes a one-dimensional laser array with a one-dimensional scanning system (e.g., scanning MEM mirror). In yet another embodiment, the source assembly 305 includes a two-dimensional scanning system with a laser source. In some embodiments, one or more wavelengths of the emitted image light 330 are in a visible spectrum. The emitted image light 330 may be polarized, e.g., the image light 330 includes elliptically polarized light. The polarization of the emitted image light 330 may change as the image light 330 propagates through the LC waveguide 315.

The input area 310 coupled to the LC waveguide 315 in-couples the image light 330 emitted from the source assembly 305 and directs the image light 330 toward the LC waveguide 315. In some embodiments, the input area 310 is an in-coupling grating that directs most of intensity (e.g., approximately 95% or higher) of the image light 330 from the source assembly 305 toward the LC waveguide 315.

The LC waveguide 315 propagates the image light 330 from the input area 310 toward the output area 320. The LC waveguide 315 includes a first glass layer 335, a second glass layer 340, and a LC layer 345 placed between the first glass layer 335 and the second glass layer 340. The first glass layer 335 refracts an incident beam of light at a first refraction angle (not shown in FIG. 3A) and propagates the refracted beam of light. The first glass layer 335 also includes a first reflecting surface 350 configured to reflect a beam of light due to total internal reflection (TIR), e.g., back to the LC layer 345. The first glass layer 335 comprises one or more types of glass materials. In some embodiments, a thickness of the first glass layer 335 is approximately 0.4 mm, preferably less than 0.2 mm or 0.1 mm. A size of the first glass layer 335 may be approximately between 2 and 3 square inches. In some embodiments, a refractive index of the first glass layer 335 is approximately 1.55 or higher, preferably above 1.7. In some embodiments, the first glass layer 335 may include a substantially transparent (in the visible band) conductive electrode film (e.g., indium tin oxide (ITO) film, poly(3,4-ethylenedioxythiophene) polystyrene sulfonate (PEDOT:PSS), etc.) that is coated onto a glass surface (not shown in FIG. 3A) of the first glass layer 335 that is in contact with the LC layer 345, e.g., having a thickness of less than 30 nm. A refractive index of the substantially transparent conductive electrode film may be matched to that of the first glass layer 335 to reduce Fresnel reflection loss.

Similarly, the second glass layer 340 refracts an incident beam of light at a second refraction angle (not shown in FIG. 3A) and propagates the refracted beam of light. The second glass layer 340 also includes a second reflecting surface 355 configured to reflect a beam of light due to the TIR, e.g., back to the LC layer 345. The second glass layer 340 comprises one or more types of glass materials. In some embodiments, a thickness of the second glass layer 340 is approximately 0.4 mm, preferably less than 0.2 mm or 0.1 mm. A size of the second glass layer 340 may be approximately between 2 and 3 square inches. In some embodiments, a refractive index of the second glass layer 340 is approximately 1.55 or higher, preferably above 1.7. In some embodiments, the second glass layer 340 may include a substantially transparent (in the visible band) conductive electrode film (e.g., ITO film, PEDOT:PSS, etc.) that is coated onto a glass surface (not shown in FIG. 3A) of the second glass layer 340 that is in contact with the LC layer 345, e.g., having a thickness of less than 30 nm. A refractive index of the substantially transparent conductive electrode film may be matched to that of the second glass layer 340 to reduce Fresnel reflection loss.

The LC layer 345 may be implemented as a single large LC cell. Alternatively, the LC layer 345 may be implemented as an array of LC cells, e.g., by patterning the ITO layer. The LC layer 345 may include one or more types of liquid crystals (not shown in FIG. 3A). When propagating through the LC layer 345, a beam of light refracts at a certain angle depending on a refractive index of the LC layer 345. Propagating through the LC layer 345 will also lead to a certain phase delay of the light beam depending on the refractive index of the LC layer 345. The refractive index of the LC layer 345 is based on orientations of liquid crystal cells in the LC layer 345, which depend on one or more electric fields (on or more voltages) applied to the LC layer 345 by the substantially transparent conductive electrode film. In some embodiments (not shown in FIG. 3A), a separate electric field (voltage) is applied to a different type of liquid crystal in the LC layer 345. An electric field (voltage) applied to a portion of the LC layer 345 may be controlled based in part on instructions from the controller 325. The LC layer 345 may be modulated (e.g., turned on and off with a certain frequency) based in part on instructions from the controller 325. The modulation of the LC layer 345 with a certain switching frequency may cause averaging out of interference patterns of out-coupling image light 330 at the output area 320, which leads to substantially uniform brightness of the image light 330 directed to the eye 230.

The image light 330 in-coupled to the LC waveguide 315 via the input area 310 propagates, after certain refraction (not shown in FIG. 3A), through the first glass layer 335 toward the LC layer 345. The image light 330 then propagates, after certain refraction, through the LC layer 345 to the second glass layer 340. Then, the image light 330 propagates, after certain refraction, through the second glass layer 340 to the second reflecting surface 355 of the second glass layer 340. The image light 330 reflects from the second reflecting surface 355 back to the second glass layer 340 and then to the LC layer 345. The LC layer 345 then propagates, after certain refraction, the reflected image light 330 to the first glass layer 335 and then to the first reflecting surface 350 of the first glass layer 335. The image light 330 reflects from the first reflecting surface 350 back to the first glass layer 335 and then to the LC layer 345. The process of reflecting the image light 330 from the first surface 350 of the first glass layer 335, propagating through the first glass layer 335, the LC layer 345, the second glass layer 340 and reflecting back from the second reflecting surface 355 of the second glass layer 340 is repeated until the image light 330 reaches the output area 320 (e.g., an out-coupling grating). The out-coupling grating of the output area 320 out-couples the image light 330 as image light 360 having substantially homogenous (uniform) brightness toward a user's eye, e.g., toward the eye 230 through the eye-box 220. Brightness of the image light 360 out-coupled toward the user's eye 230 is uniform within the designated field-of-view. For example, the designated field-of-view can be from +/−15 degrees to +/−60 degrees. In some embodiments, in order to avoid degradation of user experience, non-uniformity between neighboring pixels is set to be less than 1%. On the other hand, in the conventional waveguide-based display (i.e., conventional pupil expander) implemented without the LC layer 345 being placed between the pair of glass layers 335, 340, light beams propagates through a waveguide in multiple paths with approximately the same optical path length, causing some light beams to be canceled and some other light beams to be superimposed. Due to this multipath interference effect, brightness of light beams (image light) emitted from conventional waveguide-based display is non-uniform, which negatively affects visual experience.

The controller 325 controls operations of one or more components of the waveguide-based display assembly 302 shown in FIG. 3A. In some embodiments, the controller 325 provides emission instructions to the source assembly 305. Based on the emission instructions, the controller 325 may control intensity of the image light 330 emitted by the source assembly 305, a time duration during which the source assembly 305 is activated, foveated rendering of the image light 330 based on eye tracking information obtain from an eye tracker integrated into the NED 100 (not shown in FIG. 3A), etc.

The controller 325 controls an electric field (voltage level) applied to the LC layer 345 to adjust a refractive index of the LC layer 345, phase delay of the image light 330 propagating through the LC layer 345, and polarization modulation of the image light 330 propagating through the LC layer 345. In some embodiments, considering the LC layer 345 with a single type of liquid crystal, the controller 325 applies, to the LC layer 345, a first voltage level during a first time period and a second voltage level during a second time period, wherein the second voltage level is different than the first voltage level. After that, during a third time period, the controller 325 may again apply the first voltage level to the LC layer 345, and the controller 325 may again apply the second voltage level to the LC layer 345 during a fourth time period, and so on. The controller 325 may repeat this process of switching voltage levels and operational states of the LC layer 345 a defined number of times with a specific switching frequency. In one or more embodiments, the first voltage level is a non-zero voltage level and the second voltage level is a zero voltage level. Thus, the controller 325 may be configured to switch an electric field applied to the LC layer 345 from a non-zero value to zero and vice versa, i.e., the controller 325 may switch an operational state of the LC layer 345 from an active state to an inactive state and vice versa with a predetermined switching frequency. For example, the controller 325 may switch the operational state of the LC layer 345 with a frequency of approximately 1 KHz or higher.

By periodically changing the operational state of the LC layer 345 (i.e., by "modulating" the LC layer 345), the controller 325 effectively modulates the image light 330 propagating through the LC waveguide 315 providing different phase delays and polarization modulation. Because the image light 330 passes through different light paths within the "modulated" LC waveguide 315, phase delays of the image light 330 associated with the different light paths are slightly different leading to a different interference pattern of the image light 330 at the output area 320. The interference patterns of the image light 330 at the output area 320 may be then averaged out within a frame of displayed image. Note that an interference pattern due to multipath interference is a function of a phase delay difference between different light paths at any given time. For example, a phase delay difference of 0 degrees (i.e., no phase delay difference) and a phase delay difference of 180 degrees would result into completely different interference patterns. By modulating the LC layer 345 at a much higher frequency than a frame rate, a different interference pattern can be crated at any given time instant. Since the modulation frequency is much higher than the frame rate (e.g., the modulation frequency of 1 KHz vs. the frame rate of 60 Hz), each frame actually consists of a plurality of interference patterns, wherein each interference pattern is significantly different from any other interference pattern of the plurality of interference patterns. A user wearing the NED 100 would perceive the frame as an average of the plurality of interference patterns. The average of the plurality of interference patterns perceived by the user is intrinsically much more uniform than any of a single interference pattern perceived by a user of the conventional waveguide NED system. Because of that, brightness of the image light 360 out-coupled from the output area 320 to the user's eye 230 is substantially homogenous (uniform), leading to a substantially uniform displayed image. The LC waveguide 315 in FIG. 3A operates as a de-speckle device. In some embodiments, the controller 325 switches an operational state of the LC layer 345 with a frequency of approximately 1 KHz to effectively average out a spackle pattern of the image light 360 ejected from the LC waveguide 315 to the user's eye 230.

Figure 3B:
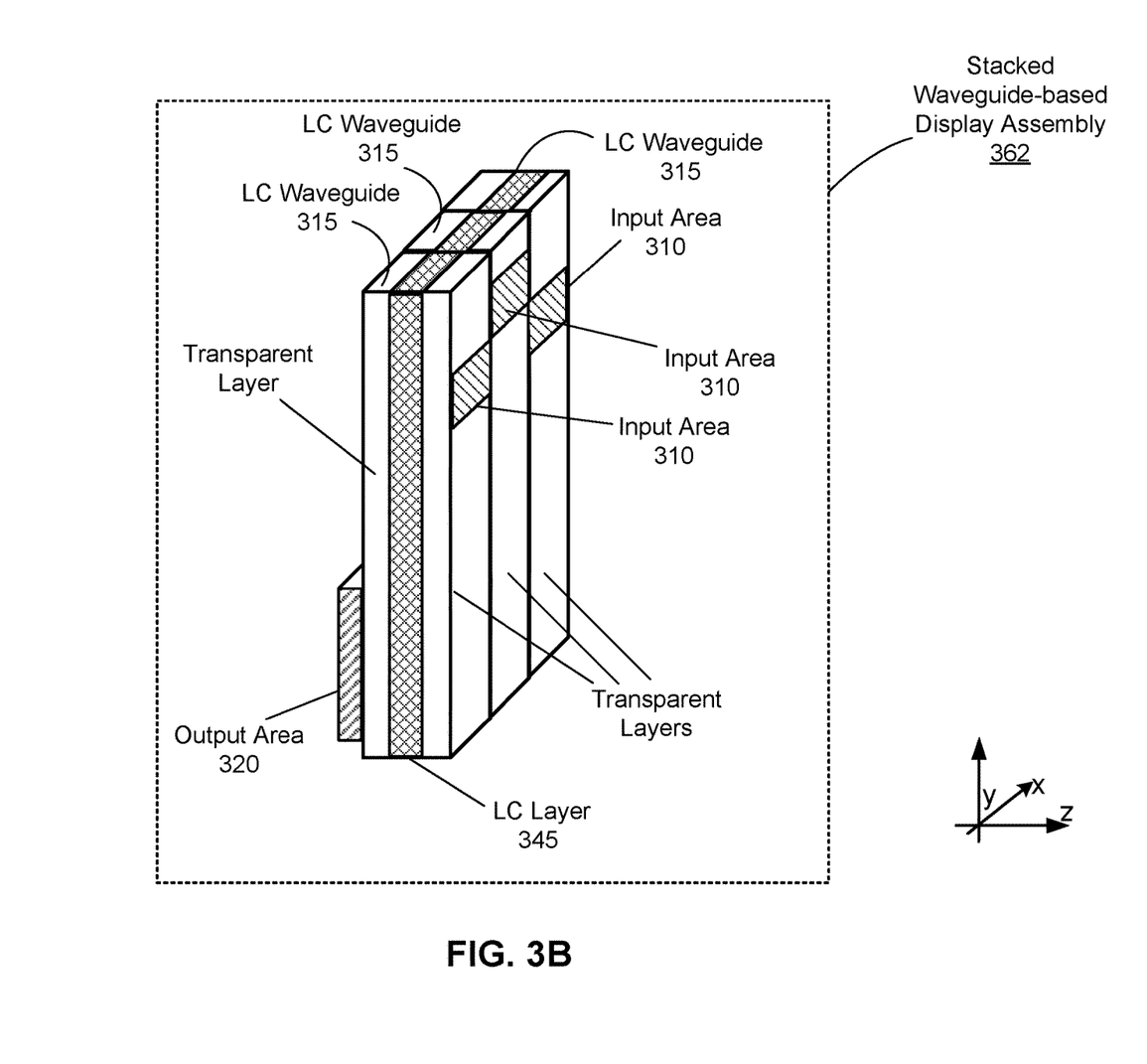
FIG. 3B is a cross-section of a waveguide-based display comprising a plurality of stacked LC waveguides, which may be part of the NED in FIG. 1, in accordance with an embodiment.

As discussed, the image light 330 (and the homogenous image light 360) may include light having one or more wavelengths in the visible spectrum. In some embodiments, the image light 330 (and the homogenous image light 360) is multi-color light. In alternate embodiments, the image light 330 (and the homogenous image light 360) is selected from a group consisting of: red light having wavelength(s) between, e.g., 620 nm and 750 nm, green light having wavelength(s) between, e.g., 495 nm and 570 nm, and blue light having wavelength(s) between, e.g., 450 nm and 495 nm. In this case, the waveguide-based display 302 is implemented as a stacked display that includes multiple stacked LC waveguides 315, e.g., three stacked LC waveguides 315, as shown in FIG. 3B. Each LC waveguide 315 of a stacked waveguide-based display 362 of FIG. 3B is then configured to generate homogenous image light of a specific color. Additional details regarding a stacked display are described with regard to U.S. application Ser. No. 15/495,373, filed on Apr. 24, 2017, which is incorporated by reference in its entirety.

Figure 4:
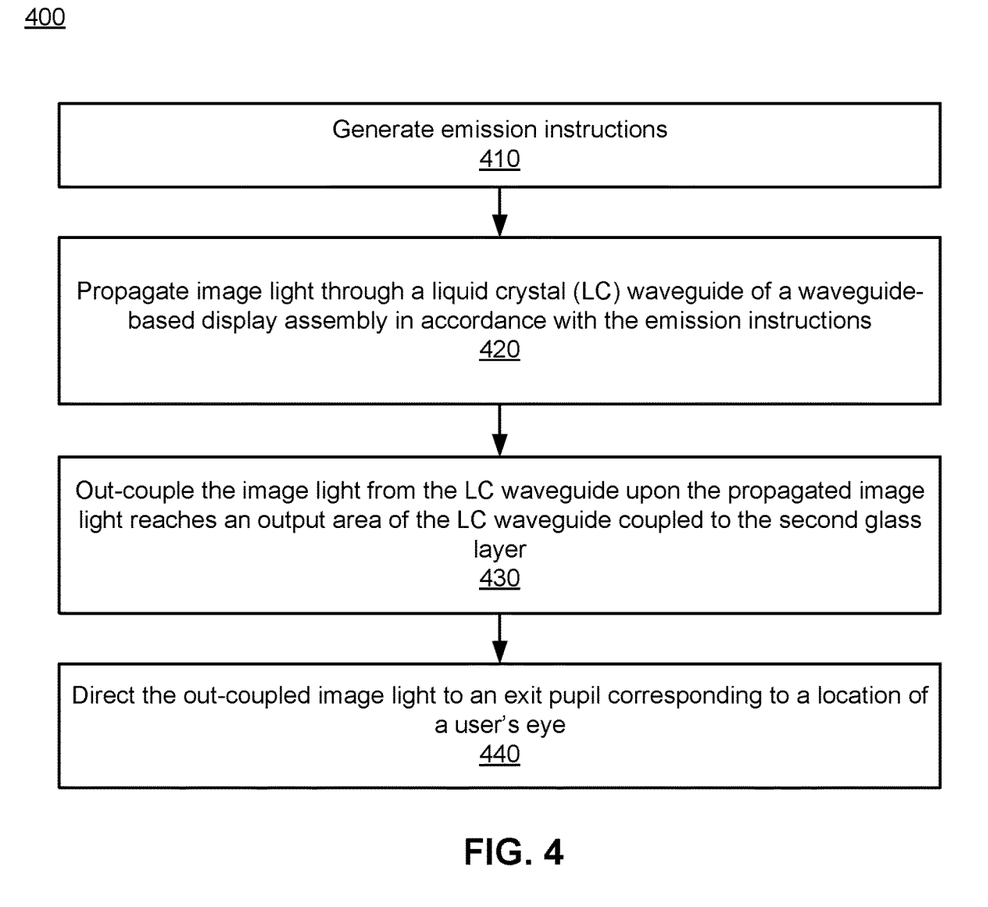
FIG. 4 is a flow chart illustrating a process of generating homogeneous display images, which may be implemented at the NED shown in FIG. 1, in accordance with an embodiment.

FIG. 4 is a flow chart illustrating a process 400 of generating homogeneous display images, which may be implemented at the NED 100 shown in FIG. 1, in accordance with an embodiment. The process 400 of FIG. 4 may be performed by the components of a NED (e.g., the NED 100). Other entities may perform some or all of the steps of the process in other embodiments. Likewise, embodiments may include different and/or additional steps, or perform the steps in different orders.

The NED generates 410 (e.g., via a controller) emission instructions. In some embodiments, the NED generates the emission instructions for controlling operation of a source assembly within a waveguide-based display assembly of the NED. Based on the emission instructions, the source assembly may emit image light. In some embodiments, the NED generates the emission instructions which include information about a level of voltage applied to a LC waveguide of the waveguide-based display assembly. Responsive to the level of voltage in the emission instructions, the NED controls an operational state of a LC layer in the LC waveguide and modulates the image light propagating through the LC waveguide.

The NED propagates 420 (e.g., via a waveguide-based display assembly) image light through a liquid crystal (LC) waveguide of the waveguide-based display assembly in accordance with the emission instructions. The LC waveguide includes a first glass layer coupled to an input area that in-couples the image light to the LC waveguide, a second glass layer, and a LC layer between the first glass layer and the second glass layer. In some embodiments, the image light propagates through the LC waveguide by reflecting multiple times from reflecting surfaces of the first and second glass layers and propagating through the LC layer before reaching the output area. While the image light propagates through the LC waveguide, the NED controls (e.g., via the controller) a state of the LC layer in the LC waveguide, e.g., based on one or more levels of voltages applied to the LC layer controlled based in part on the emission instructions from the controller. By controlling the state of the LC layer in the LC waveguide, the NED effectively modulates the image light propagating through the LC waveguide to generate image light having substantially homogeneous brightness.

In some embodiments, the waveguide-based display assembly is implemented as a stacked display that includes a plurality of stacked LC waveguides comprising the LC waveguide stacked to one or more other LC waveguides. Each LC waveguide in the plurality of stacked LC waveguides comprises a liquid crystal between a pair of glass layers. Each LC waveguide propagates a portion of the image light having a defined range of wavelengths in accordance with the emission instructions. Furthermore, each LC waveguide in the plurality of stacked LC waveguides out-couples the portion of the image light to the user's eye via an out-coupling grating coupled to one glass layer of the pair of glass layers.

The NED out-couples 430 (e.g., via the output area) the image light from the LC waveguide upon the propagated image light reaches the output area of the LC waveguide coupled to the second glass layer. In some embodiments, the output area includes an out-coupling grating that out-couples the image light from the second glass layer of the LC waveguide toward the user's eye. The image light out-coupled from the LC waveguide toward the user's eye has substantially uniform brightness across the output area, which provides improved visual experience for the user. In contrast, brightness of image light out-coupled from the conventional waveguide-based display is non-uniform, which negatively affects user's visual experience.

The NED directs 440 (e.g., via an optical assembly) the out-coupled image light to an exit pupil corresponding to a location of the user's eye. The image light reaching the user's eye is of substantially homogenous (uniform) brightness across the output area. Thus, images displayed to the user are substantially uniform.

System Environment

Figure 5:
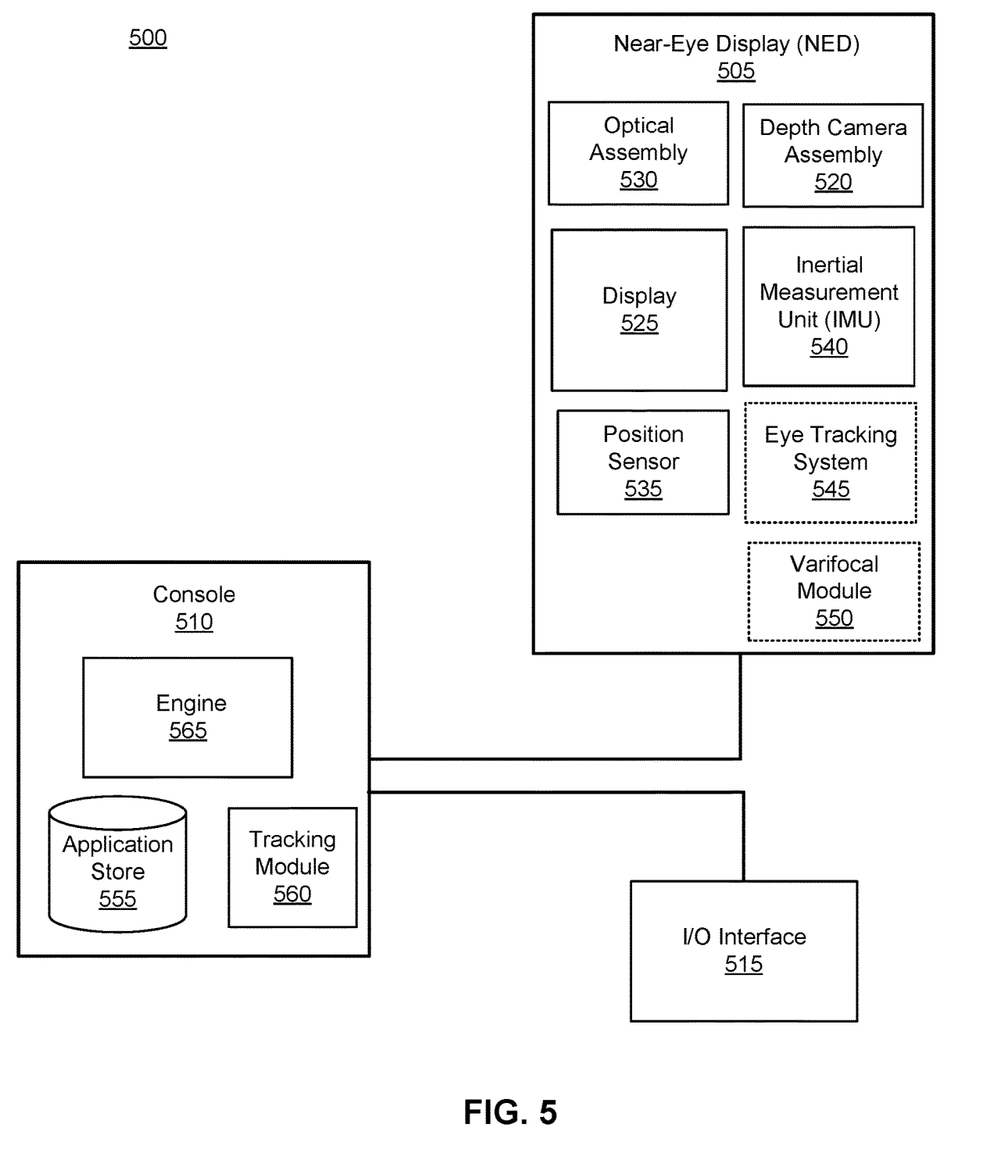
FIG. 5 is a block diagram of a system environment that includes the NED shown in FIG. 1, in accordance with an embodiment.

FIG. 5 is a block diagram of one embodiment of a NED system 500 in which a console 510 operates. The NED system 500 may operate in a VR system environment, an AR system environment, a MR system environment, or some combination thereof. The NED system 500 shown by FIG. 5 comprises a NED 505 and an input/output (I/O) interface 515 that is coupled to the console 510. While FIG. 5 shows an example NED system 500 including one NED 505 and on I/O interface 515, in other embodiments any number of these components may be included in the NED system 500. For example, there may be multiple NEDs 505 each having an associated I/O interface 515, with each NED 505 and I/O interface 515 communicating with the console 510. In alternative configurations, different and/or additional components may be included in the NED system 500. Additionally, functionality described in conjunction with one or more of the components shown in FIG. 5 may be distributed among the components in a different manner than described in conjunction with FIG. 5 in some embodiments. For example, some or all of the functionality of the console 510 is provided by the NED 505.

The NED 505 is a near-eye display or a head-mounted display that presents content to a user comprising virtual and/or augmented views of a physical, real-world environment with computer-generated elements (e.g., two-dimensional or three-dimensional images, two-dimensional or three-dimensional video, sound, etc.). In some embodiments, the presented content includes audio that is presented via an external device (e.g., speakers and/or headphones) that receives audio information from the NED 505, the console 510, or both, and presents audio data based on the audio information. The NED 505 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the NED 505 is the NED 100 described above in conjunction with FIG. 1.

The NED 505 may include a DCA 520, a display 525, an optical assembly 530, one or more position sensors 535, an IMU 540, an optional eye tracking system 545, and an optional varifocal module 550. Some embodiments of the NED 505 have different components than those described in conjunction with FIG. 5. Additionally, the functionality provided by various components described in conjunction with FIG. 5 may be differently distributed among the components of the NED 505 in other embodiments.

The DCA 520 captures data describing depth information of an area surrounding the NED 505. The data describing depth information may be associated with one or a combination of the following techniques used to determine depth information: structured light, time of flight, or some combination thereof. The DCA 520 can compute the depth information using the data, or the DCA 520 can send this information to another device such as the console 510 that can determine the depth information using data from the DCA 520.

The DCA 520 includes an illumination source, an imaging device, and a controller. The illumination source emits light onto an area surrounding the NED 505. In an embodiment, the emitted light is a structured light. The illumination source includes a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (e.g., edge emitters), inorganic or organic light-emitting diodes (LEDs), a vertical-cavity surface-emitting laser (VCSEL), or some other source. In some embodiments, a single emitter or a plurality of emitters in the illumination source can emit light having a structured light pattern. The imaging device captures ambient light and light from one or more emitters of the plurality of emitters of the plurality of emitters that is reflected from objects in the area. The imaging device may be an infrared camera or a camera configured to operate in a visible spectrum. The controller coordinates how the illumination source emits light and how the imaging device captures light. In some embodiments, the controller also determines depth information associated with the local area using the captured images.

The display 525 displays two-dimensional or three-dimensional images to the user in accordance with data received from the console 510. In various embodiments, the display 525 comprises a single display or multiple displays (e.g., a display for each eye of a user). In some embodiments, the display 525 comprises a single or multiple waveguide displays. Each waveguide display of the display 525 (e.g., one waveguide display for each eye of a user) comprises a LC waveguide (e.g., the LC waveguide 315 shown in FIG. 3A) with a LC layer placed between two glass layers. Light can be coupled into the single or multiple waveguide displays via, e.g., a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a laser-based display, one or more waveguides, some other display, a scanner, one-dimensional array, or some combination thereof. Light out-coupled from each waveguide display based on a LC waveguide has substantially uniform brightness, which provides improved visual experience for a user. An embodiment of the display 525 is the waveguide-based display assembly 302 described above in conjunction with FIG. 3A.

The optical assembly 530 magnifies image light received from the display 525, corrects optical errors associated with the image light, and presents the corrected image light to a user of the NED 505. The optical assembly 530 includes a plurality of optical elements. Example optical elements included in the optical assembly 530 include: an aperture, a Fresnel lens, a convex lens, a concave lens, a filter, a reflecting surface, or any other suitable optical element that affects image light. Moreover, the optical assembly 530 may include combinations of different optical elements. In some embodiments, one or more of the optical elements in the optical assembly 530 may have one or more coatings, such as partially reflective or anti-reflective coatings.

Magnification and focusing of the image light by the optical assembly 530 allows the display 525 to be physically smaller, weigh less and consume less power than larger displays. Additionally, magnification may increase the field of view of the content presented by the display 525. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optical assembly 530 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the display 525 for display is pre-distorted, and the optical assembly 530 corrects the distortion when it receives image light from the display 525 generated based on the content.

The IMU 540 is an electronic device that generates data indicating a position of the NED 505 based on measurement signals received from one or more of the position sensors 535 and from depth information received from the DCA 520. A position sensor 535 generates one or more measurement signals in response to motion of the NED 505. Examples of position sensors 535 include: one or more accelerometers, one or more gyroscopes, one or more magnetometers, another suitable type of sensor that detects motion, a type of sensor used for error correction of the IMU 540, or some combination thereof. The position sensors 535 may be located external to the IMU 540, internal to the IMU 540, or some combination thereof.

Based on the one or more measurement signals from one or more position sensors 535, the IMU 540 generates data indicating an estimated current position of the NED 505 relative to an initial position of the NED 505. For example, the position sensors 535 include multiple accelerometers to measure translational motion (forward/back, up/down, left/right) and multiple gyroscopes to measure rotational motion (e.g., pitch, yaw, roll). In some embodiments, the IMU 540 rapidly samples the measurement signals and calculates the estimated current position of the NED 505 from the sampled data. For example, the IMU 540 integrates the measurement signals received from the accelerometers over time to estimate a velocity vector and integrates the velocity vector over time to determine an estimated current position of a reference point on the NED 505. Alternatively, the IMU 540 provides the sampled measurement signals to the console 510, which interprets the data to reduce error. The reference point is a point that may be used to describe the position of the NED 505. The reference point may generally be defined as a point in space or a position related to the NED's 505 orientation and position.

The IMU 540 receives one or more parameters from the console 510. The one or more parameters are used to maintain tracking of the NED 505. Based on a received parameter, the IMU 540 may adjust one or more IMU parameters (e.g., sample rate). In some embodiments, certain parameters cause the IMU 540 to update an initial position of the reference point so it corresponds to a next position of the reference point. Updating the initial position of the reference point as the next calibrated position of the reference point helps reduce accumulated error associated with the current position estimated the IMU 540. The accumulated error, also referred to as drift error, causes the estimated position of the reference point to "drift" away from the actual position of the reference point over time. In some embodiments of the NED 505, the IMU 540 may be a dedicated hardware component. In other embodiments, the IMU 540 may be a software component implemented in one or more processors.

In some embodiments, the eye tracking system 545 is integrated into the NED 505. The eye tracking system 545 determines eye tracking information associated with an eye of a user wearing the NED 505. The eye tracking information determined by the eye tracking system 545 may comprise information about a position of the user's eye, i.e., information about an angle of an eye-gaze. The eye-tracking system 545 may comprise one or more illumination sources and an imaging device (camera).

In some embodiments, the varifocal module 550 is further integrated into the NED 505. The varifocal module 550 may be coupled to the eye tracking system 545 to obtain eye tracking information determined by the eye tracking system 545. The varifocal module 550 may be configured to adjust focus of image light emitted from the display 525, based on the determined eye tracking information obtained from the eye tracking system 545. In this way, the varifocal module 550 can mitigate vergence-accommodation conflict in relation to the image light. The varifocal module 550 can be interfaced (e.g., either mechanically or electrically) with at least one optical element of the optical assembly 530. Then, the varifocal module 550 may be configured to adjust focus of the image light emitted from the display 525 and propagated through the optical assembly 530 by adjusting an optical position of the at least one optical element of the optical assembly 530, based on the determined eye tracking information obtained from the eye tracking system 545. By adjusting the optical position, the varifocal module 550 varies focus of the image light propagated through the optical assembly 530 towards the user's eye. The varifocal module 550 may be also configured to adjust resolution of the image light emitted by the display 525 by performing foveated rendering of the image light, based at least in part on the determined eye tracking information obtained from the eye tracking system 545. In this case, the varifocal module 550 provides appropriate image signals to the display 525. The varifocal module 550 provides image signals with a maximum pixel density for the display 525 only in a foveal region of the user's eye-gaze, while providing image signals with lower pixel densities in other regions.

The I/O interface 515 is a device that allows a user to send action requests and receive responses from the console 510. An action request is a request to perform a particular action. For example, an action request may be an instruction to start or end capture of image or video data or an instruction to perform a particular action within an application. The I/O interface 515 may include one or more input devices. Example input devices include: a keyboard, a mouse, a game controller, or any other suitable device for receiving action requests and communicating the action requests to the console 510. An action request received by the I/O interface 515 is communicated to the console 510, which performs an action corresponding to the action request. In some embodiments, the I/O interface 515 includes an IMU 540 that captures calibration data indicating an estimated position of the I/O interface 515 relative to an initial position of the I/O interface 515. In some embodiments, the I/O interface 515 may provide haptic feedback to the user in accordance with instructions received from the console 510. For example, haptic feedback is provided when an action request is received, or the console 510 communicates instructions to the I/O interface 515 causing the I/O interface 515 to generate haptic feedback when the console 510 performs an action.

The console 510 provides content to the NED 505 for processing in accordance with information received from one or more of: the DCA 520, the NED 505, and the I/O interface 515. In the example shown in FIG. 5, the console 510 includes an application store 555, a tracking module 560, and an engine 565. Some embodiments of the console 510 have different modules or components than those described in conjunction with FIG. 5. Similarly, the functions further described below may be distributed among components of the console 510 in a different manner than described in conjunction with FIG. 5.

The application store 555 stores one or more applications for execution by the console 510. An application is a group of instructions, that when executed by a processor, generates content for presentation to the user. Content generated by an application may be in response to inputs received from the user via movement of the NED 505 or the I/O interface 515. Examples of applications include: gaming applications, conferencing applications, video playback applications, or other suitable applications.

The tracking module 560 calibrates the NED system 500 using one or more calibration parameters and may adjust one or more calibration parameters to reduce error in determination of the position of the NED 505 or of the I/O interface 515. For example, the tracking module 560 communicates a calibration parameter to the DCA 520 to adjust the focus of the DCA 520 to more accurately determine positions of structured light elements captured by the DCA 520. Calibration performed by the tracking module 560 also accounts for information received from the IMU 540 in the NED 505 and/or an IMU 540 included in the I/O interface 515. Additionally, if tracking of the NED 505 is lost (e.g., the DCA 520 loses line of sight of at least a threshold number of structured light elements), the tracking module 560 may re-calibrate some or all of the NED system 500.

The tracking module 560 tracks movements of the NED 505 or of the I/O interface 515 using information from the DCA 520, the one or more position sensors 535, the IMU 540 or some combination thereof. For example, the tracking module 560 determines a position of a reference point of the NED 505 in a mapping of a local area based on information from the NED 505. The tracking module 560 may also determine positions of the reference point of the NED 505 or a reference point of the I/O interface 515 using data indicating a position of the NED 505 from the IMU 540 or using data indicating a position of the I/O interface 515 from an IMU 540 included in the I/O interface 515, respectively. Additionally, in some embodiments, the tracking module 560 may use portions of data indicating a position or the NED 505 from the IMU 540 as well as representations of the local area from the DCA 520 to predict a future location of the NED 505. The tracking module 560 provides the estimated or predicted future position of the NED 505 or the I/O interface 515 to the engine 565.

The engine 565 generates a three-dimensional mapping of the area surrounding the NED 505 (i.e., the "local area") based on information received from the NED 505. In some embodiments, the engine 565 determines depth information for the three-dimensional mapping of the local area based on information received from the DCA 520 that is relevant for techniques used in computing depth. The engine 565 may calculate depth information using one or more techniques in computing depth from the portion of the reflected light detected by the DCA 520, such as the stereo based techniques, the structured light illumination technique, and the time-of-flight technique. In various embodiments, the engine 565 uses the depth information to, e.g., update a model of the local area, and generate content based in part on the updated model.

The engine 565 also executes applications within the NED system 500 and receives position information, acceleration information, velocity information, predicted future positions, or some combination thereof, of the NED 505 from the tracking module 560. Based on the received information, the engine 565 determines content to provide to the NED 505 for presentation to the user. For example, if the received information indicates that the user has looked to the left, the engine 565 generates content for the NED 505 that mirrors the user's movement in a virtual environment or in an environment augmenting the local area with additional content. Additionally, the engine 565 performs an action within an application executing on the console 510 in response to an action request received from the I/O interface 515 and provides feedback to the user that the action was performed. The provided feedback may be visual or audible feedback via the NED 505 or haptic feedback via the I/O interface 515.

In some embodiments, based on the eye tracking information (e.g., orientation of the user's eye) received from the eye tracking system 545, the engine 565 determines resolution of the content provided to the NED 505 for presentation to the user on the display 525. The engine 565 may be configured to adjust resolution of the content provided to the NED 505 by performing foveated rendering of the presented content, based at least in part on the determined eye tracking information obtained from the eye tracking system 545. The engine 565 provides the content to the NED 505 having a maximum resolution on the display 525 in a foveal region of the user's gaze, whereas the engine 565 provides a lower resolution in other regions, thus achieving less power consumption at the NED 505 and saving computing cycles of the console 510 without compromising a visual experience of the user. In some embodiments, the engine 565 can further use the eye tracking information to adjust focus of the image light emitted from the display 525 to prevent the vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A near-eye display (NED) comprising:
a source assembly configured to emit image light;
a waveguide-based display assembly coupled to the source assembly, the waveguide-based display assembly includes:
a liquid crystal (LC) waveguide comprising a first transparent layer, a second transparent layer and a LC layer between the first transparent layer and the second transparent layer, the LC layer configured to adjust phases of the image light and create a plurality of interference patterns in accordance with emission instructions causing the image light out-coupled from the LC waveguide to be substantially uniform,
an input area directly coupled to a portion of the first transparent layer and positioned outside of the LC waveguide, the input area configured to in-couple the image light into the first transparent layer of the LC waveguide, and
an output area directly coupled to a portion of the second transparent layer and positioned outside of the LC waveguide, the output area configured to out-couple the image light from the second transparent layer of the LC waveguide toward an eye-box of the NED; and
a controller configured to:
generate the emission instructions, and
provide the emission instructions to the LC waveguide.

2. The NED of claim 1, wherein the source assembly is selected from a group consisting of a one-dimensional array of micro light-emitting diodes (µLEDs) with a microelectromechanical system (MEM) mirror, a two-dimensional array of µLEDs, a one-dimensional array of lasers with a scanning MEM mirror, and a two-dimensional scanning laser.

3. The NED of claim 1, wherein the controller is further configured to:
control an operational state of the LC layer in the LC waveguide by controlling one or more voltage levels applied to the LC layer based in part on the emission instructions.

4. The NED of claim 3, wherein the controller is further configured to:
switch the operational state of the LC layer in the LC waveguide from an active state to an inactive state and vice versa with a predetermined frequency, based in part on the emission instructions.

5. The NED of claim 4, wherein the predetermined frequency of switching the operational state of the LC layer is 1 KHz.

6. The NED of claim 1, wherein the controller is further configured to:
apply an electric field of a non-zero intensity to the LC layer during a first time period, based in part on the emission instructions; and
deactivate the electric field of the LC layer during a second time period, based in part on the emission instructions.

7. The NED of claim 1, wherein the LC waveguide propagates the image light by reflecting the image light multiple times from reflecting surfaces of the first and second transparent layers and propagating through the LC layer before reaching the output area for out-coupling the image light.

8. The NED of claim 1, wherein the first and second transparent layers include indium tin oxide (ITO) films.

9. The NED of claim 8, wherein a refractive index of the ITO films matches a refractive index of the first and second transparent layers.

10. The NED of claim 1, wherein the input area includes an in-coupling grating that in-couples the image light from the source assembly to the first transparent layer of the LC waveguide.

11. The NED of claim 1, wherein the output area includes an out-coupling grating that out-couples the image light from the second transparent layer of the LC waveguide toward the eye-box.

12. The NED of claim 1, wherein:
the waveguide-based display assembly includes a plurality of stacked LC waveguides comprising the LC waveguide stacked to one or more other LC waveguides; and
each LC waveguide in the plurality of stacked LC waveguides comprises a liquid crystal between a pair of transparent layers.

13. The NED of claim 12, wherein:
each LC waveguide in the plurality of stacked LC waveguides propagates a portion of the image light having a defined range of wavelengths in accordance with the emission instructions; and
each LC waveguide in the plurality of stacked LC waveguides out-couples the portion of the image light to the eye-box via an out-coupling grating coupled to one transparent layer of the pair of transparent layers.

14. A waveguide-based display comprising:
a liquid crystal (LC) waveguide comprising a first transparent layer, a second transparent layer and a LC layer between the first transparent layer and the second transparent layer, the LC layer configured to adjust phases of the image light and create a plurality of interference patterns in accordance with emission instructions causing the image light out-coupled from the LC waveguide to be substantially uniform;
an input area directly coupled to a portion of the first transparent layer and positioned outside of the LC waveguide, the input area configured to in-couple the image light into the first transparent layer of the LC waveguide; and
an output area directly coupled to a portion of the second transparent layer and positioned outside of the LC waveguide, the output area configured to out-couple the image light from the second transparent layer of the LC waveguide toward an eye-box.

15. The waveguide-based display of claim 14, further comprising:
a controller configured to control an operational state of the LC layer in the LC waveguide by controlling one or more voltage levels applied to the LC layer.

16. The waveguide-based display of claim 15, wherein the controller is further configured to:
switch the operational state of the LC layer in the LC waveguide from an active state to an inactive state and vice versa with a predetermined frequency.

17. The waveguide-based display of claim 14, further comprising a controller configured to:
apply an electric field of a non-zero intensity to the LC layer during a first time period; and deactivate the electric field of the LC layer during a second time period.

18. The waveguide-based display of claim 14, wherein the LC waveguide propagates the image light by reflecting the image light multiple times from reflecting surfaces of the first and second transparent layers and propagating through the LC layer before reaching the output area for out-coupling the image light.

19. The waveguide-based display of claim 14, further comprising:
   a plurality of stacked LC waveguides including the LC waveguide stacked to one or more other LC waveguides,
   wherein each LC waveguide in the plurality of stacked LC waveguides comprises a liquid crystal between a pair of transparent layers.

* * * * *